(12) United States Patent
Thompson et al.

(10) Patent No.: US 11,745,295 B2
(45) Date of Patent: Sep. 5, 2023

(54) MANUFACTURE OF HEAT EXCHANGERS VIA HYBRID WELDING

(71) Applicant: Sogefi Air & Cooling USA, Inc., Rochester Hills, MI (US)

(72) Inventors: Stephen Thompson, Quebec (CA); Nuno Demetrio-Soeiro, Quebec (CA); Nicolas Becker, Porte du Ried (FR)

(73) Assignee: Sogefi Air & Cooling USA, Inc., Rochester Hills, MI (US)

( * ) Notice: Subject to any disclaimer, the term of this patent is extended or adjusted under 35 U.S.C. 154(b) by 0 days.

(21) Appl. No.: 17/579,277

(22) Filed: Jan. 19, 2022

(65) Prior Publication Data
US 2022/0305597 A1 Sep. 29, 2022

Related U.S. Application Data

(60) Provisional application No. 63/166,545, filed on Mar. 26, 2021.

(51) Int. Cl.
| | |
|---|---|
| *B23P 15/26* | (2006.01) |
| *F28F 21/06* | (2006.01) |
| *B29C 65/08* | (2006.01) |
| *B29C 65/00* | (2006.01) |
| *B29C 45/14* | (2006.01) |
| *H01M 10/6556* | (2014.01) |
| *B29L 31/18* | (2006.01) |

(52) U.S. Cl.
CPC .......... *B23P 15/26* (2013.01); *B29C 45/1418* (2013.01); *B29C 65/08* (2013.01);
(Continued)

(58) Field of Classification Search
CPC ..... B23P 15/26; B29C 45/1418; B29C 65/08; B29C 66/0246; B29C 66/72;
(Continued)

(56) References Cited

U.S. PATENT DOCUMENTS

| | | |
|---|---|---|
| 8,465,864 B1 | 6/2013 | Kwak et al. |
| 9,705,162 B2 | 7/2017 | Geise |
| (Continued) | | |

FOREIGN PATENT DOCUMENTS

CN 107283067 A 10/2017

OTHER PUBLICATIONS

Dal Conte et al., "Ultrasonic plastic welding of CF/PA6 composites to aluminium: Process and mechanical performance of welded joints", Journal of Composite Materials vol. 53(18), pp. 2607-2621, Mar. 12, 2019. (Year: 2019).*

(Continued)

*Primary Examiner* — Christopher W Raimund
(74) *Attorney, Agent, or Firm* — Warner Norcross + Judd LLP

(57) ABSTRACT

A method for forming a hybrid heat exchanger is provided. The method includes laser-texturing a metal surface to create a plurality of microstructures and subsequently melt-bonding a plastic component to the plurality of microstructures. During melt-bonding, plastic material penetrates the plurality of microstructures and conforms to the plastic component to the metal surface. After hardening inside the microstructures, the plastic component adheres to the metal surface as a hybrid component. As a result, a fastener or snap connection is not required, and the plastic-metal joint provides a barrier to water, glycol-based fluids, air, and other fluids.

11 Claims, 6 Drawing Sheets

(52) U.S. Cl.
CPC .......... *B29C 66/0246* (2013.01); *B29C 66/72* (2013.01); *B29C 66/742* (2013.01); *F28F 21/062* (2013.01); *H01M 10/6556* (2015.04); *B29L 2031/18* (2013.01); *H01M 2220/20* (2013.01)

(58) Field of Classification Search
CPC . B29C 66/742; F28F 21/062; H01M 10/6556; H01M 2220/20; B29L 2031/18
See application file for complete search history.

(56) References Cited

U.S. PATENT DOCUMENTS

| | | | |
|---|---|---|---|
| 10,511,070 | B2 | 12/2019 | Shin et al. |
| 2003/0029606 | A1 | 2/2003 | Otter |
| 2013/0149582 | A1 | 6/2013 | Kimura et al. |
| 2015/0140366 | A1 | 5/2015 | Nicholls |
| 2017/0136668 | A1* | 5/2017 | Kose .................. B23K 26/0624 |
| 2018/0248238 | A1 | 8/2018 | Pinon |
| 2018/0331338 | A1* | 11/2018 | Roderus .............. H01M 10/613 |
| 2019/0366877 | A1 | 12/2019 | Blersch et al. |
| 2021/0249710 | A1 | 8/2021 | Kimura et al. |

OTHER PUBLICATIONS

Roesner et al., "Laser Assisted Joining of Plastic Metal Hybrids", Physics Procedia, 2011, pp. 370-377, vol. 12.
International Search Report and Written Opinion issued in PCT/US2022/021532, dated Mar. 23, 2022.

* cited by examiner

MANUFACTURE OF HEAT EXCHANGERS VIA HYBRID WELDING

CROSS-REFERENCE TO RELATED APPLICATIONS

This application claims the benefit of U.S. Provisional Application 63/166,545, filed Mar. 26, 2021, the disclosure of which is incorporated by reference in its entirety.

FIELD OF THE INVENTION

The present invention relates to the manufacture of heat exchangers for dissipating heat accumulating in battery cells and in other applications.

BACKGROUND OF THE INVENTION

Heat exchangers, especially those involving fluids such as water, glycol-based liquids, oil, and air, are an indispensable and ubiquitous element of many mechanical, electrical, or hydraulic systems. For example, heat exchanger are commonly used in electrical vehicles to draw heat away from batteries having a high operating voltage. Lithium-ion battery cells in particular are known to generate significant heat during charging and discharging. For this reason, heat exchangers are typically placed in thermal communication with the battery cells to transfer heat to a suitable cooling fluid.

Metals such as steel, stainless steel, and aluminum have traditionally been used in the construction of heat exchangers, and in particular cooling plates. These materials can be welded, brazed, or mechanically assembled to form the necessary architecture of the heat exchanger. More recently, heat exchangers have included plastics. Plastics can be advantageous due to their ability to be easily molded into complex shapes, thereby reducing manufacturing costs as well as the weight of existing heat exchangers.

Due to the absence of chemical bonding between the metal and the plastic, however, the plastic is usually mechanically fastened to the metal portion, for example by crimping, riveting, or bolting the plastic portion to the metal substrate, usually with the addition of a gasket material at the interface to assure pressure leak tightness. However, there remains a continued need for an improved hybrid heat exchanger that leverages the benefits of metal and plastic materials without requiring mechanical fasteners or gasket materials and while maintaining a strong bond and the metal-plastic interface.

SUMMARY OF THE INVENTION

A method for forming a hybrid heat exchanger is provided. The method includes laser-texturing a metal surface to create a plurality of microstructures and subsequently melt-bonding a plastic component to the plurality of microstructures. During melt-bonding, plastic material penetrates the plurality of microstructures and conforms the plastic component to the metal surface. After hardening within the microstructures, the plastic component adheres to the metal surface as a hybrid component. As a result, fasteners and snap connections are not required, and the plastic-metal joint provides a barrier to water, glycol-based fluids, air, oil, and other fluids.

In one embodiment, a method for forming a hybrid heat exchanger includes laser-texturing an upper surface of a metal substrate to form a plurality of undercut channels or surface structures. Laser-texturing can be performed via laser ablation techniques using a continuous wave laser or pulsed fiber laser to etch the metal substrate in successive passes. The undercut channels or surface structures can include a depth of between 5 µm and 200 µm, inclusive. The method then includes melt-bonding an upper plastic housing to the metal substrate, optionally via hot-press welding, ultrasonic welding, laser welding or injection over-molding. During melt-bonding, plastic flows into the plurality of undercut channels and hardens to non-removably join the upper plastic housing to the metal substrate. A battery module is then mounted to the metal substrate, optionally with a thermally conductive paste or film between the battery module and the metal substrate. Alternatively, a lower plastic housing can be joined to a lower surface of the metal substrate in an identical manner, the metal substrate providing a physical barrier between a first chamber and a second chamber. The upper and lower plastic housings can include polypropylene, polycarbonate, or polyamide, and the metal substrate can include aluminum, copper, steel, or alloys thereof.

In another embodiment, a hybrid heat exchanger is provided. The hybrid heat exchanger includes a plastic housing and a metal substrate that define a chamber for a thermal fluid. The metal substrate includes multiple micro-textured regions, formed by laser-texturing, the micro-textured regions including parallel or intersecting undercut channels with a depth of between 5 µm and 200 µm. The plastic housing includes a peripheral edge penetrating the undercut channels along the entire contact area or interface between the plastic housing and the metal substrate. A battery module is mounted to the metal substrate, optionally with a thermally conductive paste or film between the battery module and the metal substrate.

In still another embodiment, the hybrid heat exchanger includes a first chamber for a first thermal fluid and a second chamber for a second thermal fluid, the first and second chambers being separated by a metal substrate. An upper plastic housing includes a peripheral edge penetrating the undercut channels along the entire contact area or interface between the upper plastic housing and the metal substrate. Similarly, a lower plastic housing includes a peripheral edge penetrating the undercut channels along the entire contact area or interface between the lower plastic housing and the metal substrate.

The hybrid heat exchangers of these and other embodiments are suitable for use in combination with a wide variety of systems, including battery modules, radiators, and intercoolers. Because the hybrid heat exchangers include lightweight plastic materials and lack a seal gasket or fasteners, the hybrid heat exchangers achieve cost and weight advantages over existing designs. The control of the temperature of an associated battery module, radiator, or intercooler can be maintained within a predetermined range to optimize system performance, optionally with the aid of one or more temperature sensors. In very cold environments, the heat exchangers can also warm the associated system to achieve an operating temperature within the predetermined desired range.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

As discussed herein, the current embodiment includes a method for manufacturing a hybrid heat exchanger. The method generally includes laser-texturing a metal surface to create microstructures therein, and subsequently melt-bonding a plastic component to the textured metal surface. The method is discussed in Part I below, with examples of a heat exchanger discussed in Part II below. While discussed below in connection with a battery heat exchanger, the present method is suitable for a wide range of applications, including heat exchangers for radiators and intercoolers.

I. Method of Manufacture

As noted above, the method of the current embodiment includes laser-texturing a metal surface to create microstructures therein, and subsequently melt-bonding a plastic component to the textured metal surface. In the current embodiment, the metal surface is a metal sheet having a high thermal conductivity and low specific weight, for example aluminum, steel, copper, and alloys thereof. The metal surface is micro-textured via continuous-wave or pulsed fiber laser etching to form a region having undercut grooves or channels. As used herein, "micro-texturing" means the selective removal or melting of material from the surface of the metal sheet, resulting in channels, recesses, or grooves having an average depth of between 1 µm and 200 µm. For example, micro-texturing the metal sheet can include forming a region of undercut grooves or channels having an average depth of between 5 and 200 µm inclusive.

Figure 1:
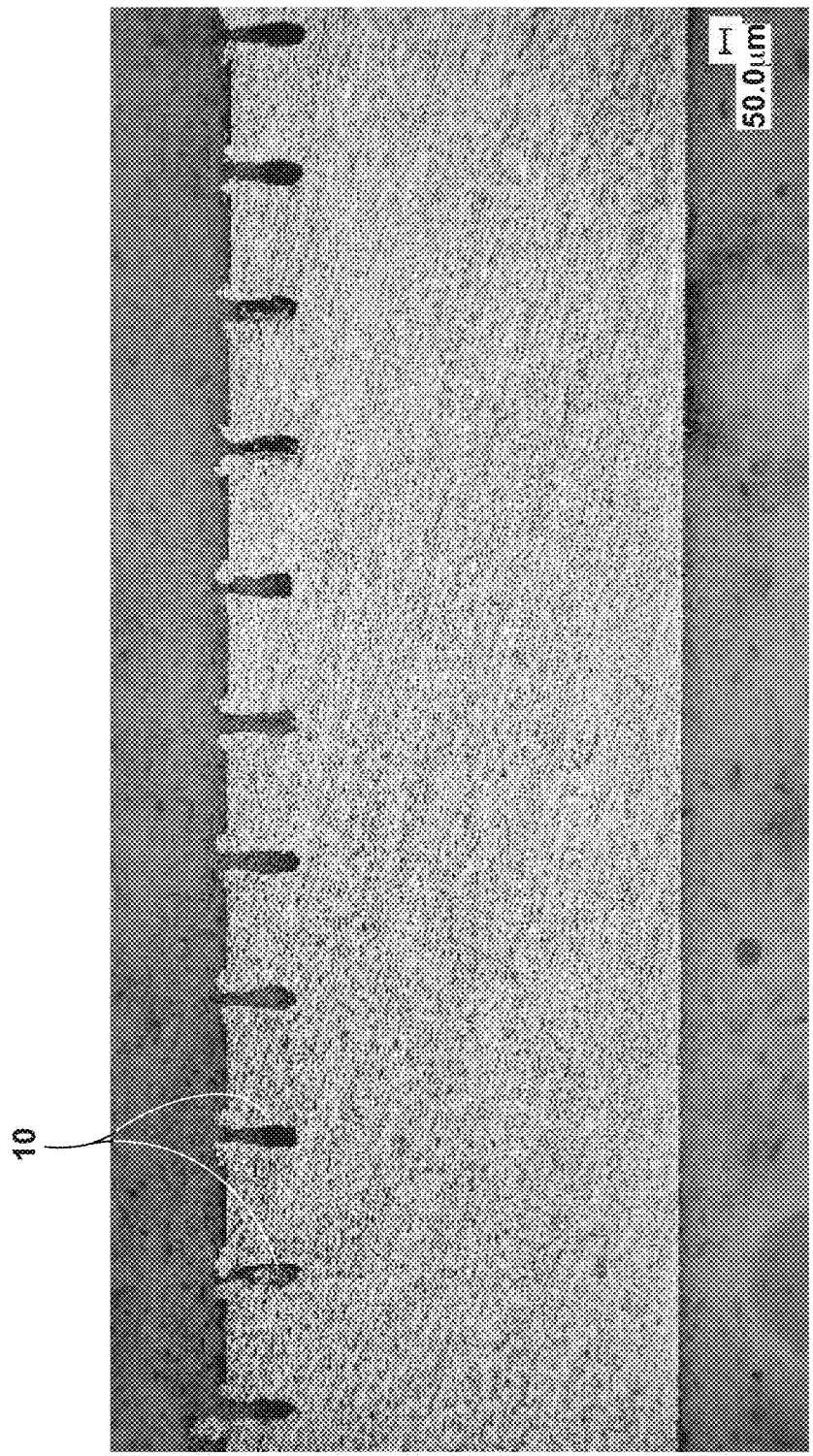
FIG. 1 is a side view of a metal sheet having a plurality of undercut microstructures formed on an upper surface thereof.
Figure 2:
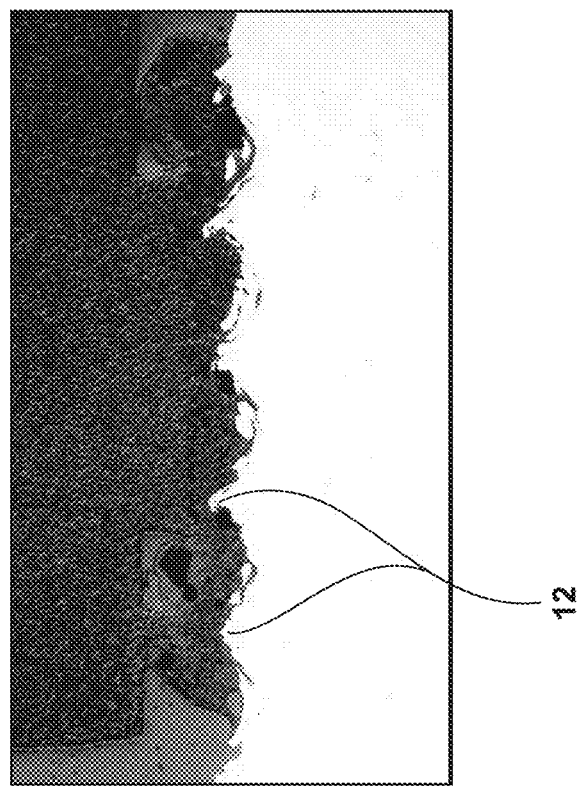
FIG. 2 are top and side views of a metal sheet having a plurality of undercut microstructures including parallel furrows formed with successive laser passes.
Figure 2:
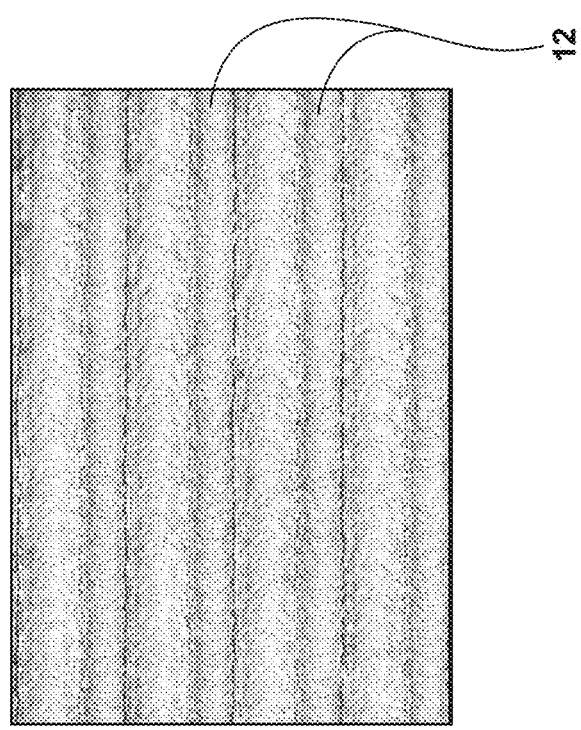

Micro-texturing can be performed via pulsed laser ablation or continuous-wave laser etching, by non-limiting example. Pulsed laser ablation can be performed using excimer lasers and solid-state lasers such as the Nd:YAG laser. Continuous-wave laser etching can be performed using a 1000 W laser with a 25-50 µm focal spot size. As shown in FIG. 1, the undercut grooves or channels 10 may be spaced apart in parallel, such that no two channels 10 intersect. Alternatively, the undercut grooves or channels 10 may intersect each other, optionally in a quadrilateral arrangement. Forming the undercut grooves or channels is achieved with successive passes of the laser per groove or channel, optionally at least three passes per groove or channel. Undercut microstructures may also be created using successive lines of laser-generated melting to create furrows 12 with wavelike ripples, shown in FIG. 2 for example.

Each groove or channel 10 includes an undercut, i.e., a width that increases in the depth-wise direction. For example, each undercut groove or channel can include a surface opening defining a width of approximately 20 µm, increasing to a maximum width of approximately 40 µm at an intermediate point between the surface opening and the base of the groove or channel. The undercut grooves or channels can be spaced apart from each other by between 100 µm and 400 µm, for example, while other spacings can be used in other embodiments. To prevent interactions between adjacent grooves or channels, the ratio of channel width (e.g., the width at the surface opening) to channel separation (e.g., the distance between the midpoint of adjacent surface openings) can be at least 1:5, further optionally at least 1:10. As discussed below, the undercut grooves or channels promote improved polymer-to-metal adhesion, which provides a strong bond and obviates the need for an intermediate gasket element or fasteners.

After forming a micro-textured region of the metal surface, the method includes melt-bonding a plastic component to the micro-textured region. This step can include hot-press welding the plastic component to the metal surface, injection over-molding the plastic component to the metal surface, or ultrasonically welding the plastic component to the metal surface, depending on the polymer selected for the given application. Hot-press welding includes heating a plastic surface and a metal surface until melting occurs, and concurrently or subsequently pushing the plastic surface and the metal surface together within a hot press. Heating can be performed according to any desired method, including laser heating, induction heating, hot plate heating, or more simply by conduction heating through the metal component. Interface pressures of between 1 MPa and 3 MPa can assure a pressure-tight weld. Injection over-molding includes over-molding the plastic component directly onto the micro-textured metal surface, such that molten plastic penetrates the undercut grooves and channels and cures under high pressures to conform to the metal surface. Ultrasonic welding includes the application of ultrasonic waves at the plastic-metal interface, resulting in localized heating of the interface. Compression forces are applied to allow bonding to occur, typically via a sonotrode tip and anvil. Ultrasonic welding can be used in applications where the plastic component is formed from ABS, PP, PA6, or PA66, though other plastics can also be used.

In the application of these joining techniques, plastic material penetrates the undercut grooves or channels and conforms to the metal surface against which it is contacted.

After hardening inside the undercut grooves or channels, the plastic component and the metal component are now joined. As a result, a fastener or snap connection is not required, and the plastic component adheres to the metal surface as a hybrid component. The micro-textured interface provides a tortuous leak path seal, which provides a barrier to cooling fluids, for example water, glycol-based fluids, oil, and air. The plastic component can optionally include filler material within a polymer matrix. The filler material can include glass fibers, carbon fibers, graphite fibers, or carbon nanotubes, for example. The polymer matrix can include polypropylene, polycarbonate, and polyamide, for example. The filler can be present in the plastic component at 30% by weight or less, optionally as a uniform distribution of fibers or powders.

II. Hybrid Heat Exchanger

Figure 3:
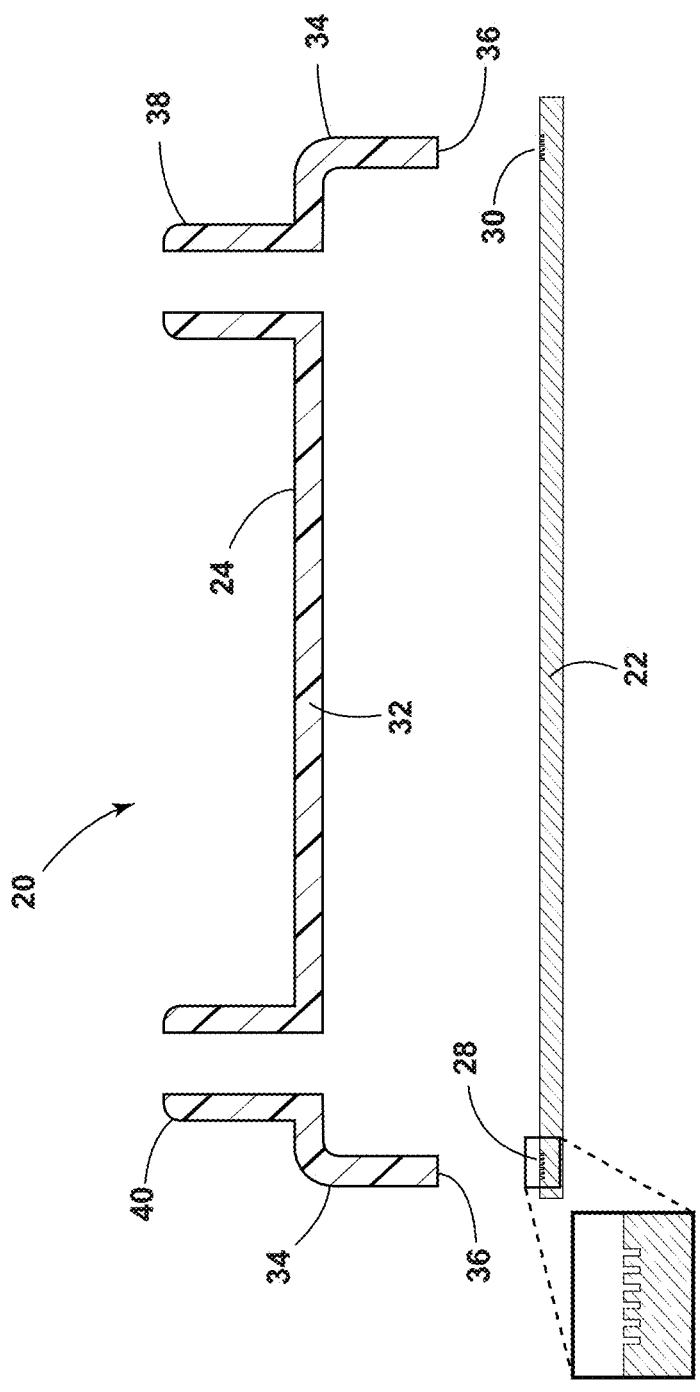
FIG. 3 is a cross-sectional representation of a plastic housing and a metal sheet including a micro-textured upper surface.
Figure 4:
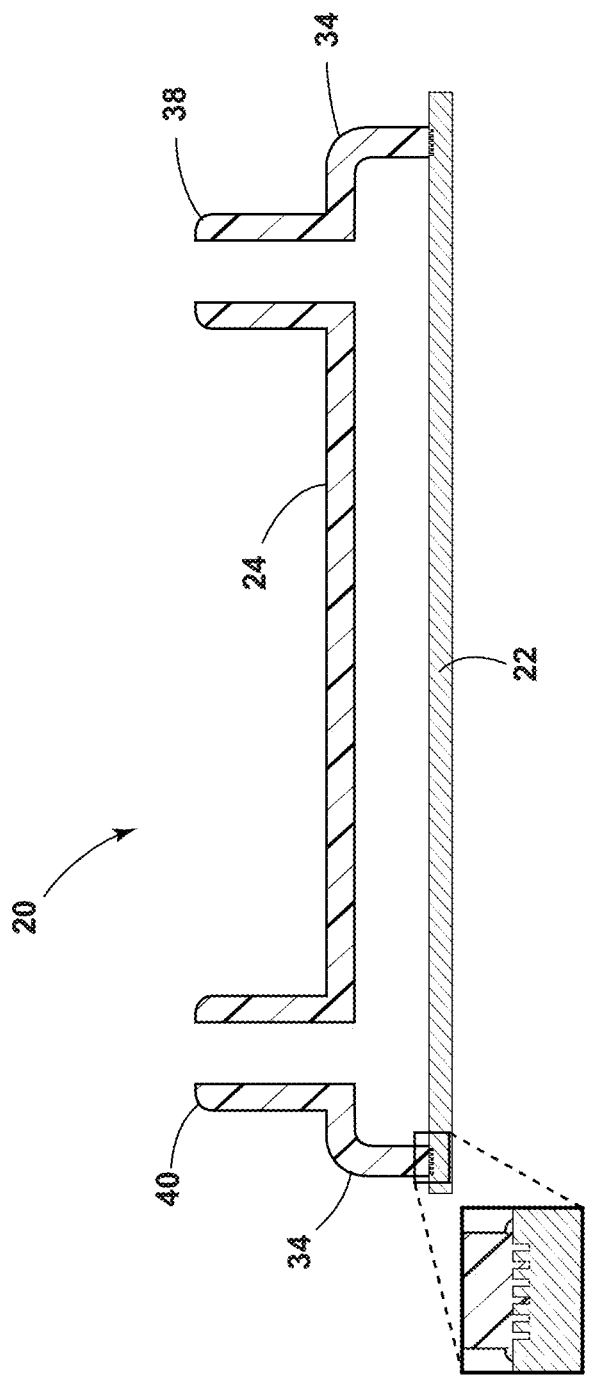
FIG. 4 is a cross-sectional representation of melt-bonding the plastic housing of FIG. 3 to the metal sheet of FIG. 3 in the manufacture of a heat exchanger.
Figure 5:
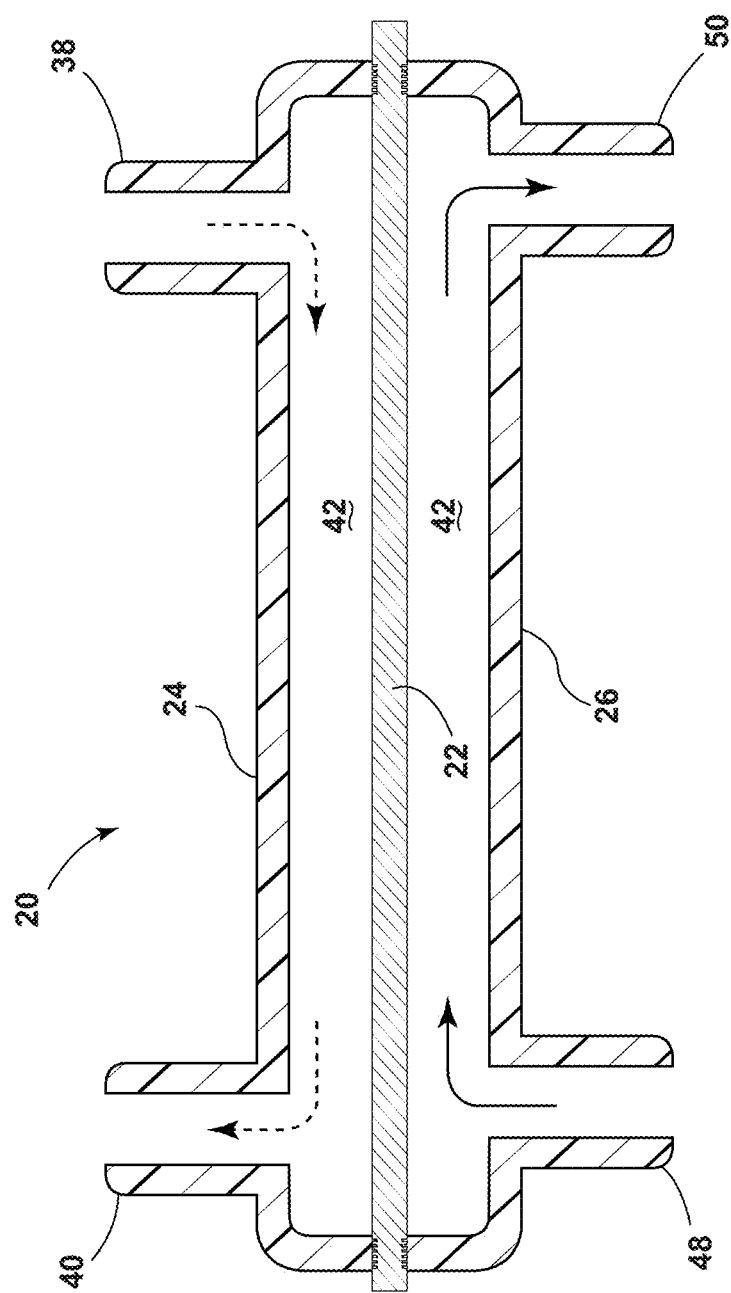
FIG. 5 is a cross-sectional representation of a heat exchanger including a first plastic component melt-bonded to a micro-textured metal sheet and a second plastic component melt-bonded to a micro-textured metal sheet.

As one example, the present method can be applied in the manufacture of a heat exchanger. Referring now to FIGS. 3-5, the heat exchanger according to one embodiment is illustrated and generally designated 20. The heat exchanger 20 includes a metal plate 22, an upper plastic housing 24, and a lower plastic housing 26. The upper plastic housing 24 and the metal plate 22 cooperate to define a first flow passage for a first thermal fluid, and the lower plastic housing 26 and the metal plate 22 cooperate to define a second flow passage for a second thermal fluid. The second thermal fluid draws heat from the first thermal fluid through the metal plate 22, such that heat from a device (e.g., a battery module, radiator, or intercooler) is removed by indirect cooling so that the temperature of the device can be controlled.

As shown in FIG. 3, an upper surface of the metal plate 22 is micro-textured to provide a region of undercut grooves or channels. The undercut grooves or channels are aligned such that no two channels intersect. The undercut grooves or channels are formed with successive passes (e.g., at least three passes) of a laser beam. A first micro-textured region 28 is formed along a first portion of the metal plate 22 and a second micro-textured region 30 is formed along a second portion of the metal cooling plate 22. The remaining portion of the upper surface of the metal cooling plate 22 does not receive surface treatment, but may include turbulators, cooling fins, or corrugations to increase the contact area of the metal plate 22 for the transfer of heating from the first thermal fluid to the second thermal fluid.

As also shown in FIG. 3, the upper plastic housing 24 includes an end wall 32, a continuous sidewall 34 terminating at a peripheral edge 36, an inlet port 38 for the first thermal fluid, and an outlet port 40 for the first thermal fluid. The end wall 32 is spaced apart from the metal plate 22, and the sidewall 34 extends perpendicular from the end wall 32 for attachment to the metal plate 22. Following the surface treatment of the metal plate 22, the peripheral edge 36 of the continuous sidewall 34 is melt-bonded to the micro-textured regions 28, 30 of the metal plate 22. As noted above, this step can include hot-press welding the upper plastic housing 24 to the metal plate 22 or ultrasonically welding the upper plastic housing 24 to the metal plate 22. The plastic housing 24 can be pre-formed by any suitable method, including injection molding or press-molding. Alternatively, the upper plastic housing 24 can be overmolded directly onto the metal plate 22 using a multi-component die and injection molding system. After hardening, the plastic sidewall 34 and the metal plate 22 are fused together, providing a leak-tight barrier. A fastener or snap connection is not required, and the upper plastic housing 24 adheres to the metal plate 22 as a hybrid component.

As shown in FIG. 5, the lower plastic housing 26 is joined to the metal plate 22 in an identical manner, providing a heat exchanger 12 with a first chamber 42 and a second chamber 44 separated by the metal plate 12. The first thermal fluid circulates through the first chamber 42, transferring heat across the metal plate 22 to the second thermal fluid circulating through the second chamber 44. The second thermal fluid circulates through an inlet 48 and an outlet 50 defined by the lower plastic housing 26 to a cooling unit, which regulates the temperature of the second thermal fluid.

Figure 6:
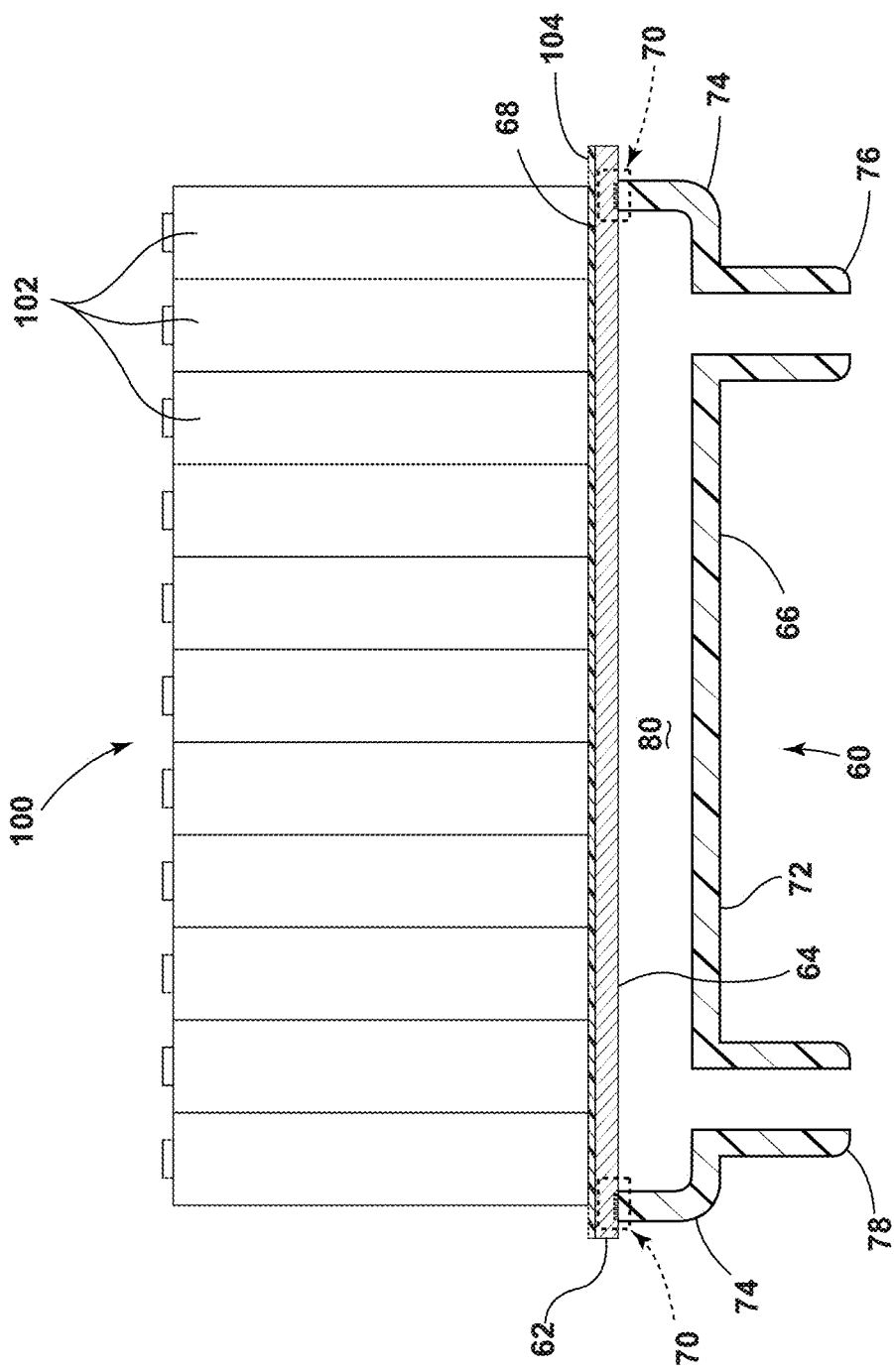
FIG. 6 is a cross-sectional representation of a heat exchanger of the present invention joined to a multi-cell battery module.

Referring now to FIG. 6, a heat exchanger in accordance with another embodiment is illustrated and generally designated 60. The heat exchanger 60 shown in combination with a battery module 100, for example a multi-cell battery module for an electric vehicle. As shown in FIG. 6, the heat exchanger 60 includes a metal substrate 62 having a first surface 64 joined to a plastic housing component 66 and having a second surface 68 in thermal contact with the battery module 100. The first surface 64 includes one or more micro-textured regions 70, the micro-textured regions 70 including a plurality of undercut channels, optionally with a depth of between 1 μm and 200 μm, inclusive. The plastic housing 66 includes an end wall 72, a continuous sidewall 74 terminating at a peripheral edge, an inlet port 76 for the thermal fluid, and an outlet port 78 for the thermal fluid. The end wall 72 is spaced apart from the metal substrate 62, and the sidewall 74 extends perpendicular from the end wall 72 for attachment to the metal substrate 62 in the manner described above. In particular, the peripheral edge of the continuous sidewall 74 is melt-bonded to the micro-textured regions 70 of the metal plate, such that plastic housing 66 and the metal substrate 62 are joined along a leak-tight seal (without a seal gasket or fasteners) and collectively define a chamber 80 for the thermal fluid. The second surface 68 of the metal substrate is in thermal contact with a plurality of battery cells 102 that comprise the battery module 100. A thermally conductive paste or film 104 is optionally between the plurality of battery cells 102 and the metal substrate 62 for improving the transfer of heat to the metal substrate 62.

As noted above, the heat exchanger 60 of the present embodiment is suitable for use in combination with a battery module 100, and in particular a battery module for an electric vehicle. Because the heat exchanger 60 includes lightweight plastic materials and lacks a seal gasket and fasteners, the heat exchanger 60 achieves cost and weight advantages over existing designs. For example, a battery module 100 with a stack of battery cells 102 (each having a cathode plate, a separator, and an anode plate) can be in thermal communication with one or more heat exchangers 60. As is known in the art, the battery cells 102 can be adjacent each other or stacked in predetermined intervals, such that adjacent battery cells are spaced apart from each other. The control of the temperature of the battery cells is maintained within a predetermined range to optimize the performance of the battery cells 102, optionally between 5° C. and 50° C., with the aid of one or more temperature sensors. In extremely cold environments, however, the heat exchanger 60 can warm the battery cells 102 to achieve the temperature within the predetermined desired range.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for manufacturing a heat exchanger, the method comprising:
   laser-texturing a portion of a first surface of a metal substrate to form a plurality of microstructures therein, the plurality of microstructures including a plurality of undercut channels that are spaced apart from each other along a portion thereof;
   melt-bonding a plastic housing to the laser-textured portion of the first surface of the metal substrate, such that a molten portion of the plastic housing flows into the plurality of undercut channels defined in the metal substrate, wherein melt-bonding the plastic housing includes ultrasonically welding the plastic housing to the first surface of the metal substrate; and
   permitting the molten portion of the plastic housing to harden while within the plurality of undercut channels, thereby joining the plastic housing to the metal substrate, wherein the plastic housing and the metal substrate define a first flow chamber for a thermal fluid, and wherein the plastic housing and the metal substrate provide a leak barrier for the thermal fluid moving through the first flow chamber,
   wherein the plastic housing is a first plastic housing, the method further including laser-texturing a portion of a second surface of the metal substrate opposite of the first surface and ultrasonically welding a second plastic housing thereto, wherein the first and second plastic housings are joined to opposing surfaces of the metal substrate, and wherein the second plastic housing and the metal substrate define a second flow chamber for the thermal fluid.

2. The method of claim 1 wherein laser-texturing is performed via laser ablation or continuous wave laser etching.

3. The method of claim 1 wherein each of the plurality of undercut channels are formed with at least three passes of laser energy.

4. The method of claim 1 wherein the plurality of undercut channels define an average depth of between 1 μm and 200 μm, inclusive.

5. The method of claim 1 wherein the plurality of undercut channels define an average width of between 5 μm and 50 μm, inclusive.

6. The method of claim 1 wherein the plurality of undercut channels are spaced apart from each other by between 100 μm and 400 μm, inclusive.

7. The method of claim 1 wherein the plurality of undercut channels define a ratio of channel width to channel spacing of at least 1:5, the channel spacing being a distance separating adjacent ones of the plurality of channels.

8. The method of claim 1 wherein the metal substrate includes aluminum, steel, copper, or alloys thereof.

9. The method of claim 1 wherein the plastic housing includes polypropylene, polycarbonate, or polyamide.

10. The method of claim 1 wherein the plastic housing includes a filler material dispersed within a polymer matrix.

11. The method of claim 10 wherein the filler material includes glass fibers, carbon fibers, graphite fibers, carbon nanotubes, or combinations thereof.

* * * * *